(12) United States Patent
McCarthy et al.

(10) Patent No.: US 6,218,632 B1
(45) Date of Patent: Apr. 17, 2001

(54) CAPACITIVE WEIGHT SENSOR

(75) Inventors: Michael C. McCarthy, Birmingham; Thomas J. Lemense, Farmington; Michael G. Fullerton, Ypsilanti, all of MI (US)

(73) Assignee: TRW Inc., Lyndhurst, OH (US)

( * ) Notice: Subject to any disclaimer, the term of this patent is extended or adjusted under 35 U.S.C. 154(b) by 0 days.

(21) Appl. No.: 09/608,727

(22) Filed: Jun. 30, 2000

Related U.S. Application Data

(63) Continuation-in-part of application No. 09/207,241, filed on Dec. 8, 1998.

(51) Int. Cl.[7] .............................. G01G 3/14; B60T 7/14; G01R 27/26; G01L 1/14
(52) U.S. Cl. ............... 177/144; 177/210 C; 73/862.626; 361/287; 361/292; 180/273; 280/735; 340/667; 340/562; 324/660
(58) Field of Search ....................... 177/136, 144, 177/210 C; 73/862.626, 862.52; 361/287, 292; 180/271, 273; 280/735; 340/667, 562; 324/660, 661, 662, 686, 670, 672, 679

(56) References Cited

U.S. PATENT DOCUMENTS

| 3,084,558 | | 4/1963 | Wilcox et al. ............... 73/862.64 |
| 4,051,721 | | 10/1977 | Williams .................. 73/141 A |
| 4,294,321 | * | 10/1981 | Wittlinger et al. .......... 177/210 C |
| 4,384,496 | | 5/1983 | Gladwin ................. 177/210 C |
| 4,562,430 | * | 12/1985 | Robinson ................ 340/870.37 |
| 4,584,885 | | 4/1986 | Cadwell ................. 73/867.64 |
| 4,825,967 | | 5/1989 | Sakamoto et al. ............. 73/141 A |
| 4,906,924 | | 3/1990 | Zannis ................... 324/207.18 |
| 5,150,759 | | 9/1992 | Borchard ................. 177/210 C |
| 5,232,243 | | 8/1993 | Blackburn et al. ........... 280/732 |
| 5,640,133 | * | 6/1997 | MacDonald et al. .......... 361/278 |
| 5,739,757 | * | 4/1998 | Gioutsos ................. 340/667 |
| 5,750,904 | * | 5/1998 | Doemens et al. ............ 73/862.623 |
| 5,827,980 | * | 10/1998 | Doemans et al. ............ 73/862.626 |
| 5,878,620 | * | 3/1999 | Gilbert et al. .............. 280/735 |
| 6,040,532 | * | 3/2000 | Munch ................... 177/144 |
| 6,087,598 | * | 7/2000 | Munch ................... 177/144 |
| 6,104,100 | * | 8/2000 | Neuman .................. 307/10.1 |

OTHER PUBLICATIONS

Field and Wave Electromagnetics, David Cheng, Addison–Wesley Publishing Co. Reading MA, pp 109–113, Mar. 1985.*

Feedback Control of Dynamic Systems, Franklin et al., Addison–Wesley Publishing Co., Reading,MA pp. 26–31, Mar. 1985.*

* cited by examiner

*Primary Examiner*—Randy W. Gibson
(74) *Attorney, Agent, or Firm*—Tarolli, Sundheim, Covell, Tummino & Szabo L.L.P.

(57) ABSTRACT

The present invention is directed to a weight sensing apparatus (10) for a vehicle seat (22). The weight sensing apparatus (10) includes a differential capacitor (150) including a first capacitor (152) and a second capacitor (176). The first capacitor (152) includes first and second opposed plate assemblies (154 and 156). The second capacitor (179) includes a third plate assembly (180) and the second plate assembly (156). Each plate assembly (154, 156, and 180) includes a plurality of electrically conductive elongated members that extend in an axial direction. The second plate assembly (156) is interposed between the first and third plate assemblies (154 and 180) and is movable in an axial direction relative to the first and third plate assemblies (154 and 180) in response to a load being applied to a vehicle seat. A source of alternating current supplies electrical energy to the differential capacitor (150) and an output circuit is electrically connected with the differential capacitor (150).

11 Claims, 3 Drawing Sheets

CAPACITIVE WEIGHT SENSOR

TECHNICAL FIELD

This application is a continuation in part of copending application 09/207,241, filed Dec. 8, 1998, and assigned to the assignee of the present invention.

The present invention relates to a weight sensing apparatus and, more particularly, to a weight sensing apparatus for a vehicle seat.

BACKGROUND OF THE INVENTION

It is desirable to determine the weight of a vehicle occupant of a vehicle seat. Upon the occurrence of a crash event, for example, an occupant restraint device may utilize an individual's weight to determine an appropriate amount of restraining force. One common type of weight sensor which may be mounted to a vehicle seat is a strain gauge sensor. Various other types of weight sensing devices have been proposed.

U.S. Pat. No. 2,968,031 to Higa discloses an electronic micrometer which measures rotational displacement by monitoring a tuned resonant circuit. The displacement of a movable member is detected by detuning the resonant circuit with a three element capacitive pick-off. An output voltage has a magnitude which is a function of both the magnitude of the input signal and the amount of displacement. In order to obtain accurate results, this circuit requires balancing the resonant circuit to the zero condition prior to each measurement.

U.S. Pat. No. 5,804,885 to Cadwell discloses a displacement measuring device which includes a variable capacitor. The variable capacitor provides a DC output signal having an amplitude which is proportional to displacement. The output signal is fed back to the variable capacitor to automatically re-balance the electrodes which form the capacitor. The feedback provides a measure of the force being transduced.

U.S. Pat. No. 4,384,496 to Gladwin similarly discloses a variable capacitor for measuring a load applied to a housing. The variable capacitor is connected within the housing and provides an output signal having an amplitude which varies according to the movement of the housing.

SUMMARY OF THE INVENTION

The present invention is directed to a weight sensing apparatus for a vehicle seat. The weight sensing apparatus comprises a differential capacitor including a first capacitor and a second capacitor. The first capacitor includes first and second opposed plate assemblies. The second capacitor includes a third plate assembly and the second plate assembly. The second plate assembly is interposed between the first and third plate assemblies and axially adjoins the first capacitor to the second capacitor. Each plate assembly includes a conductive plate. The conductive plate of the first plate assembly extends parallel to and is fixed relative to the conductive plate of the third plate assembly. The conductive plate of the second plate assembly extends parallel to and is moveable in an axial direction relative to the first and third plate assemblies in response to a load being applied to the vehicle seat. Each plate assembly has a plurality of elongated members which extend in a substantially axial direction. Each elongated member is at least partially formed from a conductive member which is electrically connected to the conductive plate of the respective plate assembly. The plurality of elongated members of the first and third plate assemblies extends toward said second plate assembly. The second plate assembly has a plurality of elongated members extending toward the first plate assembly and a plurality of elongated members extending toward the third plate assembly. The plurality of elongated members extending from the second plate assembly terminates in gaps created by the elongated members of the first and third plate assemblies. The plurality of elongated members of the second plate assembly is movable relative to the plurality of elongated members of the first and third plate assemblies. The weight sensing apparatus further comprises a source of alternating electrical energy, which provides electrical energy to the differential capacitor, and an output circuit electrically connected with the differential capacitor, which provides an output signal indicative of the load applied to the weight sensing apparatus. The output signal of the output circuit varies as a function of the capacitance of both the first capacitor and the second capacitor.

BRIEF DESCRIPTION OF THE DRAWINGS

The foregoing and other features of the present invention will become more apparent to one skilled in the art upon consideration of the following description of the invention and the accompanying drawings in which.

DESCRIPTION OF PREFERRED EMBODIMENTS

Figure 1:
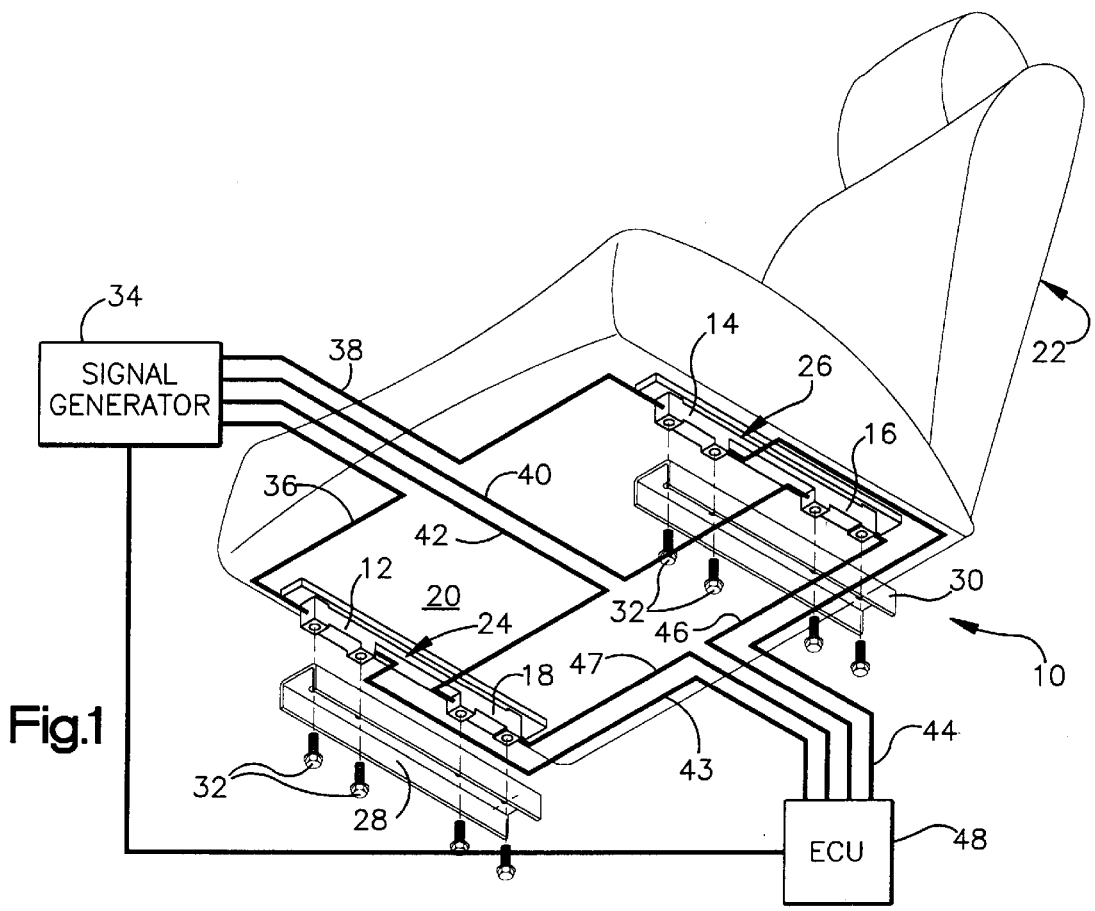
FIG. 1 is a perspective view illustrating a preferred embodiment of the present invention in combination with a vehicle seat.

FIG. 1 schematically illustrates a preferred embodiment of a weight sensing apparatus 10 in accordance with the present invention. The apparatus 10 is formed of a plurality of capacitive transducers 12, 14, 16 and 18 mounted to a lower portion 20 of a vehicle seat 22. Each capacitive transducer 12, 14, 16 and 18 is formed of a differential capacitor having a differential capacitance which varies as a function of a load applied to the vehicle seat 22. The load applied to the seat 22 is distributed among the transducers 12, 14, 16 and 18. Accordingly, the collective differential capacitance for each of the transducers 12, 14, 16, and 18 is proportional to the total applied load.

FIG. 1 illustrates the transducer assemblies 12, 14, 16, and 18 as being part of longitudinal members 24 and 26 which are attached at side edges of the lower seat portion 20. The longitudinal members 24 and 26 are attached to respective seat rails 28 and 30 by fasteners 32. It will be apparent to those skilled in the art that other types of seat connections also may be used without departing from the present invention.

As set forth in greater detail below, a source of alternating electrical energy, such as a signal generator 34, provides electrical energy as input signals 36, 38, 40 and 42 to the differential capacitors of each transducer assembly 12, 14, 16 and 18, respectively. In response to the load applied to the vehicle seat 22, the differential capacitive circuit of each transducer assembly 12, 14, 16 and 18 acts on the input signals 36, 38, 40 and 42, respectively. Each transducer assembly 12, 14, 16, and 18 provides a respective output signal 43, 44, 46 and 47 to an output circuit, which is illustrated as an electronic control unit (ECU) 48.

The ECU 48 preferably is a microcomputer preprogrammed according to the particular configuration of the capacitive circuit of each transducer assembly 12, 14, 16 and 18 for determining a weight value in response to the load applied to the vehicle seat 22. The ECU 48 might also be an application specific integrated circuit or a combination of integrated circuits and discrete components arranged and configured to perform the weight sensing function in accordance with the present invention.

Figure 2:
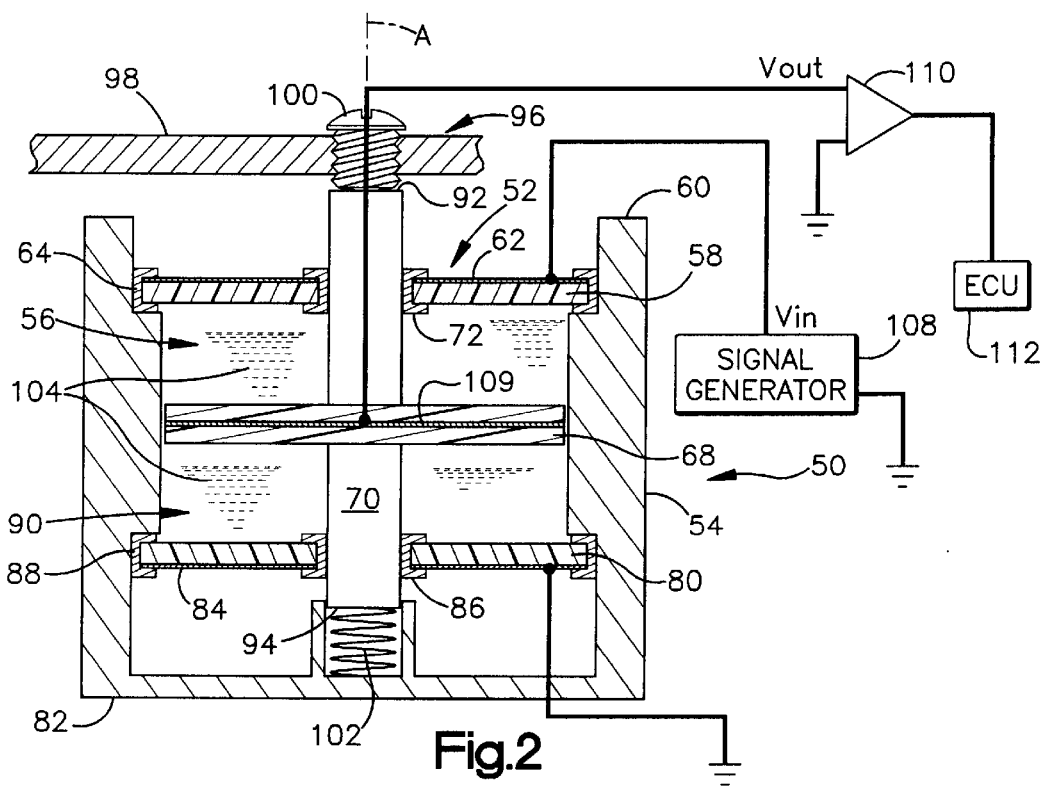
FIG. 2 is a sectional view of a first embodiment of part of FIG. 1.

FIG. 2 illustrates a weight sensing transducer apparatus 50 in accordance with a first embodiment of the present invention. In this embodiment, the transducer apparatus 50 includes a variable differential capacitor 52 mounted within a substantially rigid outer housing 54. Preferably, the housing 54 is an elongated cylindrical member of a substantially rigid and electrically nonconductive material.

The differential capacitor 52 includes a first capacitor 56 having a first plate 58 attached adjacent a first end 60 of the housing 54. The first plate 58 is formed of a dielectric material having a predetermined dielectric constant. An electrically conductive conducting plate 62 is attached at the outer surface of the dielectric plate 58. A peripheral insulating member 64 is connected with the perimeter edges of the dielectric plate 58 and the conducting plate 62. The insulating member 64 electrically insulates the first plate 58 and the conducting plate 62 from the outer housing 54 to which they are affixed.

The first capacitor 56 includes a second plate 68 which is positioned opposite and substantially parallel to the plate 58. The second plate 68 has a dielectric constant which preferably is substantially identical to the dielectric constant of the first plate 58. An electrically conductive conducting plate 109 is attached to the dielectric plate 68. The second plate 68 is movable relative to the first plate 58 through its attachment to an elongated shaft 70. The shaft 70 extends axially through an aperture formed through the center of the first plate 58 and preferably terminates at a location external to the housing 54. An inner insulating bushing 72 electrically insulates the shaft 70 from the first plate 58 and its associated conducting plate 62 as well as facilitates relative movement of the shaft.

The shaft 70 has a central axis, indicated at A. The shaft 70 is moveable along the axis A, such that its movement also effects axial movement of the plate 68 parallel to the axis A. The first capacitor 56 has a capacitance value which varies as a function of the distance between the first plate 58 and second plate 68.

The transducer apparatus 50 further includes a second capacitor 90 which is formed of the second plate 68 and a third capacitive plate 80. The third plate 80 is mounted in the housing 54 adjacent a second end 82 of the housing, suitably in a manner similar to the first plate assembly 58. The third plate 80 is spaced a fixed distance apart from and is oriented substantially parallel to the first plate assembly 58. The third plate 80 is formed of a dielectric material having a predetermined dielectric constant, which preferably is substantially identical to that of both the first and second plates 58 and 68, respectively.

A conducting plate 84 engages a surface of the third plate 80 adjacent a second end 82 of the housing 54. A central aperture is formed through the plate 80 and its associated conducting plate 84, through which the shaft member 70 is positioned and may axially traverse. An inner insulating bushing 86 is positioned at the inner periphery of the aperture surrounding the shaft 70. The bushing 86 insulates the conducting plate 84 and the third plate 80 electrically from the shaft member 70. Similarly, an outer insulating bushing 88 is attached at the outer periphery of both the third plate assembly 80 and its associated conducting plate 84 to insulate them electrically from the outer housing 54.

The second capacitor 90 formed by the third plate 80 and second plate 68 has a capacitance which varies as a function of the distance between the respective plates. Accordingly, as the shaft 70 moves axially along its central axis A, such as due to a load applied to the vehicle seat shown and described in FIG. 1, the respective capacitances of the first capacitor 56 and the second capacitor 90 vary as a function of the position of the shaft 70 and thus, the location of the second conducting plate 109 with respect to the first conducting plate 62 and the third conducting plate 84. Preferably, the capacitances of the first and second capacitors 56 and 90 vary in an inverse relationship.

The shaft 70 includes a first end 92 positioned adjacent the first end 60 of the housing 54 and a second end 94 located adjacent the second end 82 of the housing 54. In the particular embodiment illustrated in FIG. 2, the first end 92 of the shaft 70 engages a force transmitting member 96.

The force transmitting member 96 includes an elongated arm 98, which may be connected with the lower portion of the vehicle seat. The elongated arm 98 may be formed of a generally rigid, yet resilient material, such as aluminum. Alternatively, it may be formed of a substantially rigid material. The arm 98 operates to transfer force from the seat 22 to the transducer apparatus 50. The amount of force transmitted generally depends upon the location and manner of attachment of the apparatus 50 to the seat 22.

A set screw 100, suitably formed of a substantially rigid plastic material, such as Nylon, preferably is screwed into an appropriately threaded bore formed in the arm 98. The set screw 100 may be adjusted to position the second plate 68 at a desired rest position, such as about half-way between the first plate assembly 58 and the third plate assembly 80.

The second end 94 of the shaft 70 engages a spring element 102, which has a predetermined spring constant for resisting axial movement of the shaft member 70. It will be apparent to those skilled in the art that the configuration of the force transmitting member 96 and the location and number of springs may be modified in various ways without departing from the present invention.

Preferably, a fluid material 104 having a predetermined dielectric constant also is disposed within the housing 54, at least between the respective plates 58, 68 and 80. The fluid material 104 may be a dielectric grease material, such as a silicone grease, to increase the capacitance of the first and second capacitors 56 and 90, respectively. Preferably, the dielectric fluid 104 is selected as to remain at an appropriate viscosity over a wide temperature range, suitably between about −40° C. and 125° C.

A suitable dielectric grease, for example, is Nyogel 741F, which is manufactured by Nye Lubricants of Plymouth, Mass. The dielectric fluid material 104 inhibits moisture from collecting within the housing 54 as well as increases the capacitance of each capacitor 56 and 90. Advantageously, the fluid 104 also reduces incidental movement and vibrations of the shaft and the attached plate assembly 68, thereby providing for a more accurate indication of weight.

If the housing of the apparatus 50 is filled with a dielectric fluid, a fluid connection must exist between the first capacitor 56 and the second capacitor 90 to allow fluid flow when the second plate 68 is moved axially. As shown in FIG. 2, a space is located between the second plate 68 and the housing 54. The space between the second plate 68 and the housing 54 will allow fluid flow during axial movement of the second plate 68 within the housing 54. Those skilled in the art will recognize that the manner in which fluid communicates between the first capacitor 56 and the second capacitor 90 may be varied.

A source of electrical energy, such as a signal generator 108, provides an alternating electric field as an input signal ($V_{in}$) to the first conducting plate 62. The conducting plate 84 of the third dielectric plate 80 is electrically coupled to an electrical ground potential. Accordingly, the input signal $V_{in}$ energizes the first capacitor 56 which, in turn, energizes the second capacitor 90 according to their respective capacitances. An output signal ($V_{out}$) is taken at the second plate 68, which is interposed between the first and third plates 58 and 80, respectively. The output $V_{out}$ is taken from the conducting plate 109 located within the second plate 68.

This arrangement of the first and second capacitors 56 and 90, respectively, operates as a voltage divider circuit. The output signal $V_{out}$ is proportional to the differential capacitance of the first capacitor 56 relative to the second capacitor 90.

The output signal $V_{out}$ is amplified by a suitable amplifier circuit 110. The amplifier circuit 110 provides an amplified output signal $V_{out}$ to an ECU 112, such as described above with respect to FIG. 1.

Figure 3:
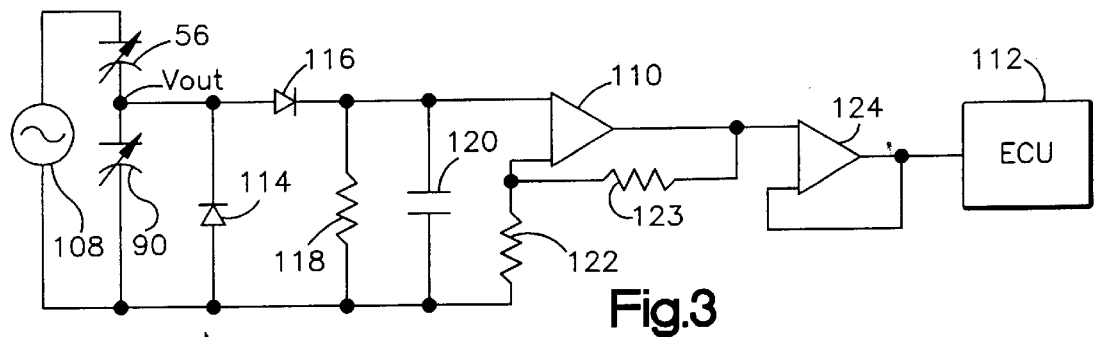
FIG. 3 is a preferred representation of circuit schematic for the apparatus illustrated in FIG. 2.

FIG. 3 illustrates a schematic representation corresponding to the apparatus of FIG. 2. Preferably, the signal generator 108 is a current source which provides a high frequency alternating current to the first capacitor 56, such as greater than about 200 kHz.

As a load is applied to the vehicle seat 22, the force transmitting member 96 effects axial movement of the shaft 70 and second plate 68, which is affixed to the shaft 70. The axial movement is relative to the first and the third plates 58 and 80. The amount of movement is proportional to the applied load and is dependent upon the spring constant of the spring 102. Movement of the second plate 68 toward the second end 82 of the housing 54 decreases the capacitance of the first capacitor 56 and causes a corresponding increase in the capacitance of the second capacitor 90.

The output voltage signal $V_{out}$ biases a pair of diodes 114 and 116, which collectively form a peak voltage detector. The peak output voltage $V_{out}$ is passed through an RC filter formed of a resistor 118 and a capacitor 120. The filtered peak output voltage is provided to an input of the amplifier circuit 110. A resistor 122 is connected between a second input of the amplifier circuit 110 and ground potential. Another resistor 123 is connected to the second input of the amplifier 110 and to the output of the amplifier. The amplified output signal is provided to a buffer 124 which, in turn, provides a buffered signal to the ECU 112.

The ECU 112 determines a weight value for the applied load transmitted by the force transmitting member 96 based upon the processed output signal $V_{out}$ and the known spring constant of the spring element 102 in apparatus 50. It will be appreciated that the peak output voltage signal $V_{out}$ from the AC voltage divider formed by the capacitors 56 and 90 varies substantially linearly with the position of the second plate assembly 68. Consequently, the ECU 112 may easily determine a weight value associated with detected movement of the shaft member 70. The weight value, for example, may be determined by a predetermined look-up table based upon the configuration of the apparatus 50. Alternatively, the ECU 112 may determine the weight value through appropriate calculations.

Preferably, a plurality of such transducer assemblies, such as shown and described with respect to FIG. 1, are associated with a vehicle seat 22. Accordingly, the ECU 112 determines a weight value in response to the output voltage signals from respective voltage divider circuits of each of the assemblies. In general, the total weight value will equal the sum of weight values from each of the corresponding transducer assemblies.

Figure 4:
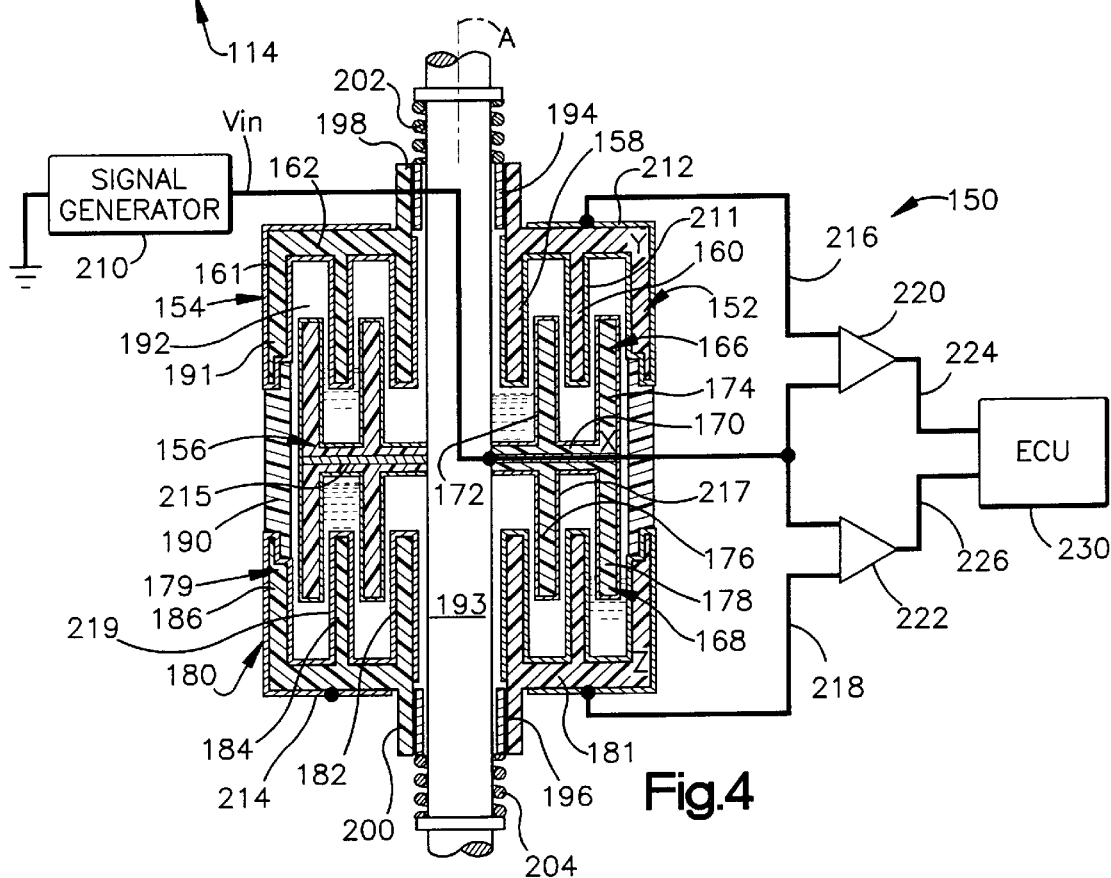
FIG. 4 is a sectional view of a second embodiment of part of FIG. 1.

Another embodiment of a differential capacitance weight sensing transducer apparatus 150 is illustrated in FIG. 4. Like the first embodiment, this apparatus 150 includes a first variable capacitor 152 formed of a first plate assembly 154 and an opposed and substantially parallel second plate assembly 156.

Preferably, the first plate assembly 154 includes a plurality of elongated concentric cylinders 158, 160 and 161 extending from a fixed base portion 162 in an axial direction. The sidewall portions of each of the cylindrical members 158, 160 and 161 of the first plate assembly 154 are substantially coaxial with a central axis A, which extends longitudinally through the center of the concentric cylindrical members 158, 160 and 161. An electrically conductive conducting plate 212 is fixed to the fixed base portion 162 of the first plate assembly 154. Each elongated concentric cylinder member 158, 160, and 161 has a conductive member 211 which is electrically connected to the conducting plate 212. The conductive member 211 of the elongated concentric cylinder members 158, 160, and 161 may be an electrically conductive coating which surrounds each concentric cylinder member 158, 160, and 161, as shown in FIG. 4, or may be an electrically conductive extension from the conducting plate 212 which extends axially through each concentric cylinder member 158, 160, and 161.

The second plate assembly 156 includes a pair of oppositely extending portions 166 and 168, which extend outwardly from a generally planar central base portion 170. The base portion 170 is substantially perpendicular to the axis A and preferably is parallel to base portion 162. An electrically conductive conducting plate 215 is fixed to the base portion 170 of the second plate assembly 156. The first portion 166 of the second plate assembly 156 includes at least one and preferably a plurality of elongated concentric cylindrical members 172 and 174. The cylindrical members 172 and 174 extend substantially intermediate and parallel to adjacent pairs of the cylindrical members 158, 160 and 161 of the first plate assembly 154. The elongated concentric cylinder members 172 and 174 of the second plate assembly 156 have a conductive member 217 which is electrically connected to the conducting plate 215. The conductive member 217 of the elongated concentric cylinder members 172 and 174 may be an electrically conductive coating which surrounds each concentric cylinder member 172 and 174, as shown in FIG. 4, or may be an electrically conductive extension from the conducting plate 215 which extends axially through each concentric cylinder member 172 and 174.

Similarly, the other portion 168 of the second plate assembly 156 extends outwardly from the central base portion 170 generally parallel to the axis A and away from the first plate assembly 154. The second portion 168 also includes at least one and preferably a plurality of concentric cylindrical members 176 and 178. These concentric cylindrical members 176 and 178, like cylindrical members 172 and 174, have an electrically conductive member 217 that either surrounds the respective cylindrical members, as shown in FIG. 4, or extends through the cylindrical members 176 and 178.

In addition, the cylindrical members of the respective first and second portions 166 and 168 may each be formed of integral cylinders which extend axially through the central base portion 170.

The differential capacitor 150 further includes a second variable capacitor 179 which is formed of a third plate assembly 180 and the second portion 168 of the second plate assembly 156. The third plate assembly 180 includes a fixed base portion 181 and a plurality of elongated and substantially parallel concentric cylindrical members 182, 184 and 186. The cylindrical members 182, 184 and 186 are coaxial with and circumscribe the axis A. The cylindrical members 176 and 178 of the second plate assembly 156 extend substantially intermediate and parallel to the respective adjacent pairs of the cylindrical members 182, 184 and 186 of the third plate assembly 180. Preferably, the cylindrical members 182, 184 and 186 of the third plate assembly 180 are positioned directly opposite the cylindrical members 158, 160 and 161 of the first plate assembly 154.

An electrically conductive conducting plate 214 is fixed to the fixed base portion 181 of the third plate assembly 180. Each elongated concentric cylinder member 182, 184, and 186 has a conductive member 219 which is electrically connected to the conducting plate 214. The conductive member 219 of the elongated concentric cylinder members 182, 184, and 186 may be an electrically conductive coating which surrounds each concentric cylinder member 182, 184, and 186, as shown in FIG. 4, or may be an electrically conductive extension from the conducting plate 214 which extends axially through each concentric cylinder member 182, 184, and 186.

The outer cylindrical members 161 and 186 of the first and third plate assemblies 154 and 180, respectively, are connected to each other through a cylindrical insulating member 190 to form an outer housing 191. The insulating member 190 electrically insulates the respective first and third plate assemblies 154 and 180.

A fluid material 192 may be disposed within the housing 191, preferably filling the interstitial space between adjacent pairs of the cylindrical members 158, 160, 161, 172, 174, 176, 178, 182, 184, and 186. The fluid 192 engages at least a substantial portion of the cylindrical members. The fluid material 192 may be a dielectric grease material, such as the dielectric fluid described above. Again, as described above, when a fluid fills the apparatus 150, a fluid connection between the first capacitor 152 and the second capacitor 179 is necessary to allow fluid flow between the respective capacitors during axial movement of the second plate assembly 156. As shown in FIG. 4, the spacing between the second plate assembly 156 and the insulating members 190 which connect the first and third plate assemblies 154 and 180 allows fluid to flow between the respective capacitors 152 and 179.

As with the first embodiment illustrated in FIG. 2, the second plate assembly 156 is affixed to a movable shaft 193. Suitable insulating bushings 194 and 196 are affixed at opposed end portions 198 and 200 of the first and third plate assemblies 154 and 180, respectively. The end portions 198 and 200 circumscribe the shaft 192 and are spaced from the shaft by the respective bushings 194 and 196. The bushings 194 and 196 electrically insulate the shaft 193 from the first and third plate assemblies 154 and 180, respectively. In addition, the bushings 194 and 196 facilitate the axial movement of the shaft 193 along the axis A, as well as help keep the fluid material 192 within the housing 191.

In this particular embodiment, a pair of springs 202 and 204 are illustrated for resisting movement the shaft 193 and the second plate assembly 156 relative to the first and third plate assemblies 154 and 180, respectively. One end of the shaft 193 is connected with a portion of the vehicle seat 22 for receiving a load applied to the seat 22. The housing 191 should be fixed relative to the shaft 193, such as to a vehicle body portion. This provides for the desired relative movement of the second plate assembly 156 within the housing 191 and with respect to the first and the third plate assemblies 154 and 180. Preferably, the housing 191 is mounted within an enclosure, such as the longitudinal members 24 and 26 illustrated in FIG. 1.

It will be understood and appreciated that a plurality of such transducer assemblies 150 typically will be associated with the vehicle seat 22, such as shown and described with respect to FIG. 1. It also will be apparent that, rather than the pair of springs 202 and 204, a single spring 202 or a mechanically biased connecting arm may be provided to resist axial movement of the shaft 193 and the second plate assembly 156 relative to the first and third plate assemblies 154 and 180, respectively.

The concentric cylinders of each of the plate assemblies 154, 156 and 180 preferably are formed of dielectric material, such as a suitable plastic material, and include the respective conductive members 211, 217, and 219.

The arrangement of the respective plate assemblies 154, 156, and 180 of this embodiment allow a greater variance in capacitance between the first capacitor 152 and the second capacitor 179 when a load placed upon the vehicle seat 22 moves the shaft 193 and the second plate assembly 156 axially relative to the first and third plate assemblies 154 and 180. This greater variance in capacitance occurs due to a simultaneous change in the interactive surface area of the conductive members and a change in the distance between the conductive plates of each capacitor 152 and 179. As a load is placed on the vehicle seat 22, the shaft 193 moves axially downward (as shown in FIG. 4) and the second plate assembly 156 moves away from the first plate assembly 154 and toward the third plate assembly 180.

When the second plate assembly 156 moves away from the first plate assembly 154, the distance between the conductive plates 212 and 215 increases. At the same time, the interactive surface area between conductive members 211 and 217 decreases as the elongated cylindrical members 172 and 174 of the second plate assembly 156 are removed from between elongated cylindrical members 158, 160, and 161 of the first plate assembly 154. Thus, as the second plate assembly 156 moves away from the first plate assembly 154, the capacitance of the first capacitor 152 decreases dramatically as a result of the simultaneous change in distance and interactive surface area.

When the second plate assembly 156 moves toward the third plate assembly 180, the distance between the conductive plates 215 and 214 decreases. At the same time, the interactive surface area between conductive members 217 and 219 increases as the elongated cylindrical members 176 and 178 of the second plate assembly 156 are inserted between elongated cylindrical members 182, 184, and 186 of the third plate assembly 180. Thus, as the second plate assembly 156 moves toward the third plate assembly 180, the capacitance of the second capacitor 179 increases dramatically as a result of the simultaneous change in distance and interactive surface area.

Consequently, the ratio of the capacitances of the first capacitor 152 to the second capacitor 179 is changed dramatically by a slight change in the position of the second plate assembly 156. Accordingly, this arrangement provides a significant change in the differential capacitance for relatively small amounts of movement of the shaft 193 and the second plate assembly 156, thereby providing for an enhanced sensitivity to a load applied to the vehicle seat 22.

It is to be understood and appreciated by those skilled in the art that a greater number of axially extending cylindrical members may extend from each plate assembly. A greater number of cylindrical plate members provides for a greater capacitance which, in turn, provides for greater sensitivity to changes in capacitance. The particular number of cylindrical members of the second plate assembly 156 should correspond to the number cylindrical members extending from the first and third plate assemblies 154 and 180.

Instead of a serial connection of capacitors, as in the embodiment of FIG. 2, the embodiment of FIG. 4 illustrates with the first and second capacitors 152 and 179 connected in parallel with each other. A signal generator 210 is electrically connected to the central plate 170 of the second plate assembly 156. The signal generator 210 provides an input signal $V_{in}$, preferably an alternating electric field in the form of electric pulses.

The conductive plates 212 and 214 receive electrical energy transmitted from a conductive plate 215 within the second plate assembly 156. Output signals 216 and 218 are taken at the conducting plates 212 and 214. The output signals 216 and 218 are indicative of the capacitance between the first plate assembly 154 and the second plate assembly 156 as well as between the third plate assembly 180 and the second p late assembly 156, respectively. That is, the output signals 216 and 218 vary as a function of the capacitance of the differential capacitor 150 formed of the first and second capacitors 152 and 179.

The output signals 216 and 218 are provided to corresponding inputs of respective comparators 220 and 222. The input signal $V_{in}$ from the signal generator 210 is provided to another input of each of the comparators 220 and 222. The comparators 220 and 222 provide respective output signals 224 and 226 to the ECU 230. Each output signal 224 and 226 preferably is a series of pulses, each output signal having a pulse width functionally related to the capacitance of the respective first and second capacitors 152 and 179. In response to the output signals 224 and 226, the ECU 230 determines a weight value indicative of the load applied to the shaft 193 of the transducer apparatus 150.

It is to be understood and appreciated that the cylindrical sidewalls of the various plates 154, 156 and 180, while preferably right circular cylinders, also may be formed of various other cylindrical shapes, such as polygonal, rectangular etc.

Figure 5:
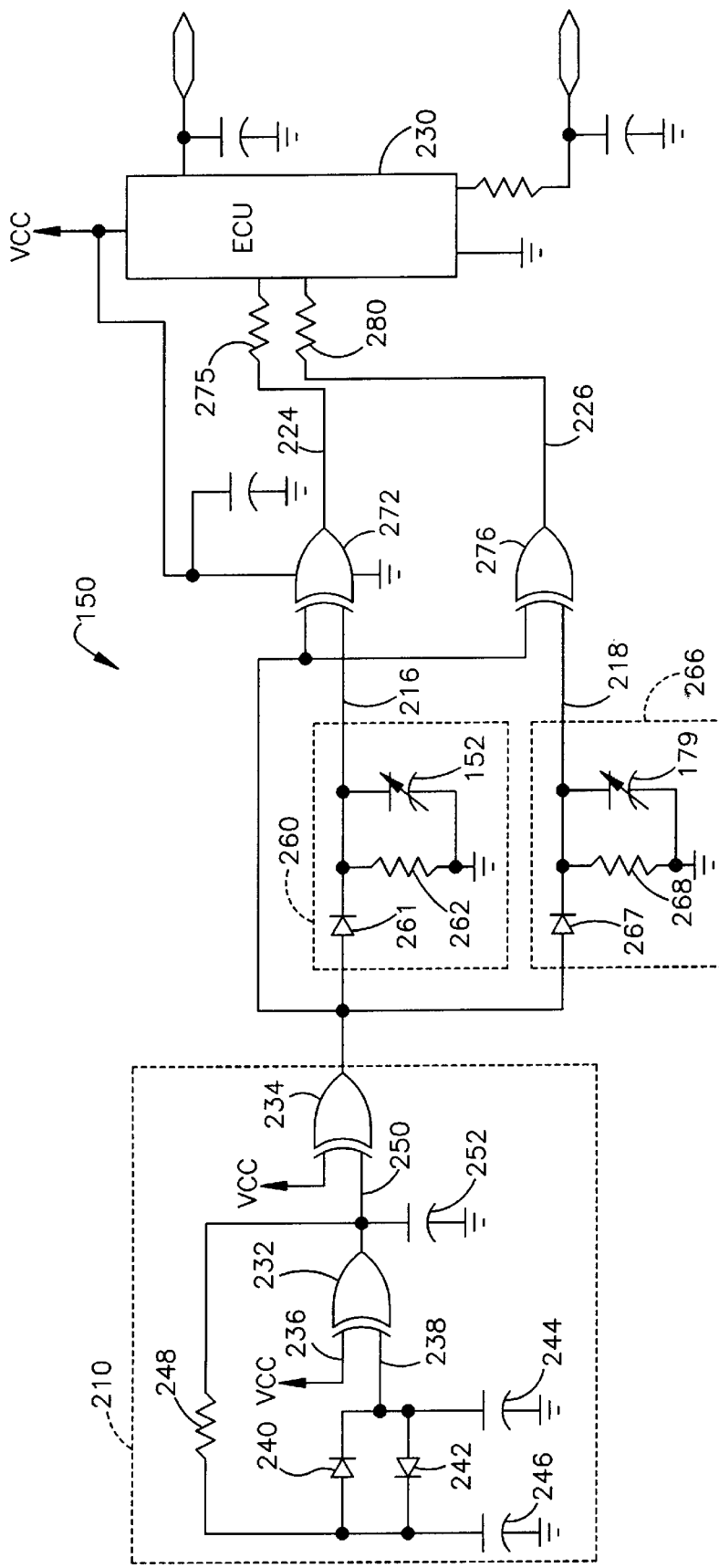
FIG. 5 is a preferred representation of a circuit schematic for the apparatus illustrated in FIG. 4.

FIG. 5 illustrates a schematic circuit representation corresponding to FIG. 4. In this embodiment, the signal generator 210 includes a first Exclusive-OR gate 232 having two inputs 236 and 238. The first input 236 is connected to a voltage control channel (VCC) of the associated integrated circuit. The second input 238 is connected to a pair of oppositely biased diodes 240 and 242 connected in parallel. The diodes 240 and 242 provide hysteresis within the signal generator 210.

A first capacitor 244 is connected between the input 238 of the Exclusive-OR gate 232 and an electrical ground potential. Another capacitor 246 is connected between the opposite end of the diodes 240 and 242 and ground potential. One end of a resistor 248 is connected at the juncture of the diodes 240 and 242 and the capacitor 246. The other end of the resistor 248 is connected to an output 250 of the Exclusive-OR gate 232. The resistor 248 and capacitors 244 and 246 form an RC circuit which determines the frequency of the signal generator 210.

Figure 6:
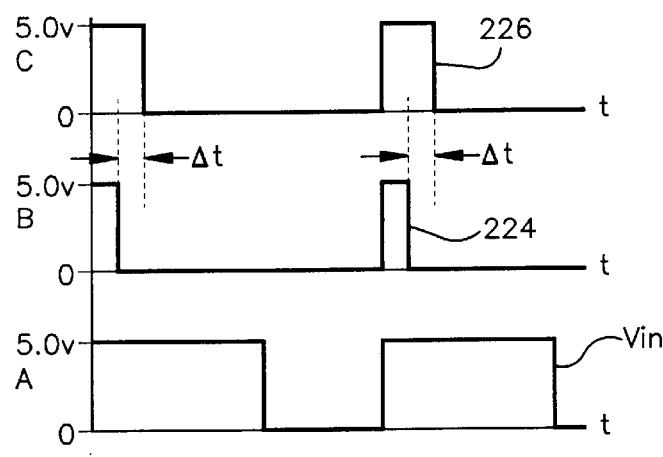
FIG. 6 is a graphical representation of certain signals of FIG. 5.

The output 250 of the Exclusive-OR gate 232 is connected with an input of a second Exclusive-OR gate 234. A capacitor 252 also is connected between the output of the first Exclusive-OR gate 232 and ground potential to stabilize the output signal from the Exclusive-OR gate 232. The other input of Exclusive-OR gate 234 is connected to the VCC. The second Exclusive-OR gate 234 provides an output signal, which is the input signal $V_{in}$ provided to the differential capacitor 150. Preferably, the $V_{in}$ signal is in the form of pulses having a positive or zero voltage, such as shown in FIG. 6 at line A.

The differential capacitor 150 is schematically illustrated as being formed of first and second capacitor circuits 260 and 266 which are connected in parallel. The first capacitor circuit 260 is formed of a biasing diode 261, which is forward biased upon the $V_{in}$ signal from the Exclusive-OR gate 234 being greater than a predetermined voltage, such as about 0.7 volts. The variable capacitor 152, which in this example is formed of the first and second capacitor plate assemblies 154 and 156, is connected in parallel with a resistor 262. The parallel combination is connected between the diode 261 and ground potential. The capacitance of the first capacitor circuit 152 varies as a function of both the distance and the interactive surface area between the first plate assembly 154 and second plate assembly 156. This distance and interactive surface area varies in response to movement of the shaft 193, such as due to an applied load.

The second capacitor circuit 266 is substantially similar to the first capacitor circuit 260. The second capacitor circuit 266 is formed of a biasing diode 267, which is forward biased upon the $V_{in}$ signal from the Exclusive-OR gate 234 being greater than about 0.7 volts. The second variable capacitor 179 is formed of the second and third plate assemblies 156 and 180, such as illustrated in FIG. 4. The second variable capacitor 179 is connected in parallel with a resistor 268 between the diode 267 and ground potential. The capacitance of the second capacitor circuit 258 varies as a function of both the distance and the interactive surface area between the third plate assembly 180 and the second plate assembly 156, such as in response to movement of the shaft 193 shown in FIG. 4.

The output 216 of the first capacitor circuit 260 is connected to an input of an Exclusive-OR gate 272. The output signal $V_{in}$ of the second Exclusive-OR gate 234 is connected to another input of the Exclusive-OR gate 272. By this arrangement, the Exclusive-OR gate 272 operates essentially as a phase detector for the first capacitor circuit 260 providing an output signal 224 to the ECU 230. An example of the output signal 224 of the Exclusive-OR gate 272 is illustrated in FIG. 6 at line B.

A resistor 275 is connected between the output of the Exclusive-OR gate 272 and the ECU 230. The Exclusive-OR gate 272 provides the output signal 224, suitably in the form of pulses, to an input of the ECU 230. The pulse width or positive duration of the output signal 224 varies as a function of the capacitance of the first capacitor circuit 260. As stated above, the capacitance of the first capacitor 152 varies as a function of the position of the second plate assembly 156 relative to the first plate assembly 154.

Similarly, the output 218 of the second capacitor circuit 266 is connected to an input of an Exclusive-OR gate 276. The input signal $V_{in}$ provided by the signal generator 210 is connected to the other input of this Exclusive-OR gate 276. The Exclusive-OR gate 276 provides an output signal 278, suitably in the form of pulses, to the ECU 230 through a resistor 280. The output signal 226 provided by Exclusive-OR gate 276 varies as a function of the capacitance of the second capacitor circuit 179. As illustrated in FIG. 4, for example, the capacitance is modified upon movement of the shaft member 193. In particular, the capacitance varies as a function of the position of the second plate assembly 156 relative to the third plate assembly 180. An example of the output signal 226 of the Exclusive-OR gate 276 is illustrated in FIG. 6 at line C.

FIG. 6 illustrates the output signals 224 and 226 from the respective Exclusive-OR gates 272 and 276 as well as the input signal $V_{in}$ provided by the signal generator 210. The output signals 224 and 226 are provided to the ECU 230 for a determination of a weight value indicative of the applied load. The positive duration, or pulse width, of each of the output signals 224 and 226 are proportional to the capacitance of each respective capacitor 152 and 179.

Preferably, the ECU 230 determines a weight value for the transducer apparatus 150 upon comparing the output signals 224 and 226 from the Exclusive-OR gates 272 and 276. The difference in the duration of the output pulses provided by the Exclusive-OR gates 272 and 276, respectively, is indicated at $\Delta t$. This $\Delta t$ value is determined in the ECU 230 through a comparison of the output signals 224 and 226.

An initial value for $\Delta t$ is stored as a calibration constant in the ECU 230. This initial value may be set by the manufacturer or periodically calculated by the ECU 230, such as when no load is being applied to the associated vehicle seat. It will be apparent to those skilled in the art that the $\Delta t$ value can be either a positive or negative value, depending upon the direction of force applied to the shaft member 192. The corresponding weight value for the load applied to the shaft member 192 is determined as a function of the $\Delta t$ value. It will be appreciated that the corresponding weight value is approximately linear with respect to the $\Delta t$ value.

It also will be understood and appreciated by those skilled in the art that the particular structures for the transducer assemblies illustrated in FIGS. 2 and 4 may be utilized with either circuit illustrated in FIGS. 3 and 5, such as through simple modifications of the electrical connections to the respective capacitor plates. It further will be understood that the signal processing for the various embodiments could be implemented using discrete circuit components or an integrated circuit configured to perform the described functions.

From the above description of the invention, those skilled in the art will perceive improvements, changes and modifications. Such improvements, changes and modifications within the skill of the art are intended to be covered by the appended claims.

Having described the invention, the following is claimed:

1. A weight sensing apparatus for a vehicle seat comprising:
   a differential capacitor including:
      a first capacitor including first and second opposed plate assemblies;
      a second capacitor including a third plate assembly and said second plate assembly;
      said second plate assembly being interposed between said first and third plate assemblies and axially adjoining said first capacitor to said second capacitor;
      each plate assembly including a conductive plate, said conductive plate of said first plate assembly extending parallel to and being fixed relative to said conductive plate of said third plate assembly, said conductive plate of said second plate assembly extending parallel to and being moveable in an axial direction relative to said first and third plate assemblies in response to a load being applied to the vehicle seat;
      each plate assembly having a plurality of elongated members which extend in a substantially axial direction, each elongated member being at least partially formed from a conductive member which is electrically connected to said conductive plate of the respective plate assembly;
      said plurality of elongated members of said first and third plate assemblies extending toward said second plate assembly;
      said second plate assembly having a plurality of elongated members extending toward said first plate assembly and a plurality of elongated members extending toward said third plate assembly, said plurality of elongated members extending from said second plate assembly terminating in gaps created by said elongated members of said first and third plate assemblies, said plurality of elongated members of said second plate assembly being movable relative to said plurality of elongated members of said first and third plate assemblies;
   a source of alternating electrical energy which provides electrical energy to said differential capacitor; and
   an output circuit electrically connected with said differential capacitor which provides an output signal indicative of the load applied to said weight sensing apparatus, the output signal of said output circuit varying as a function of the capacitance of both said first capacitor and said second capacitor.

2. The apparatus of claim 1 wherein said plurality of elongated members of the respective plate assemblies is a plurality of parallel, concentric cylindrical members.

3. The apparatus of claim 1 further including a dielectric fluid material interposed between and in communication with said first and second plate assemblies; and
   additional dielectric fluid material being interposed between and in communication with said second and third plate assemblies.

4. The apparatus of claim 1 wherein each of said first and second capacitors provides a corresponding output signal to said output circuit, said output circuit determining a difference in phase shift between the output signal of said first capacitor and the output signal of said second capacitor, the difference in phase shift being proportional to the applied load.

5. The apparatus of claim 1 further including means for monitoring a phase shift between an input signal to the first capacitor supplied by said source of electrical energy and an output signal of said first capacitor and for monitoring a phase shift between an input signal to said second capacitor supplied by said source of electrical energy and an output signal of said second capacitor, a difference between the monitored phase shift of the respective output signals of said first and second capacitors being functionally related to the applied load.

6. The apparatus of claim 5 wherein said output circuit further comprises a controller to which said means for monitoring phase shift provides a first output signal indicative of the monitored phase shift for said first capacitor and a second output signal indicative of the monitored phase shift for said second capacitor, said controller comparing the first and second output signals from said means for monitoring phase shift to determine a value indicative of the applied load.

7. The apparatus of claim 5 wherein said means for monitoring phase shift includes a pair of Exclusive-OR gates each having two inputs, one input of each of said pair of Exclusive-OR gates being coupled to said source of electrical energy for receiving the input signal, the other input of each of said pair of gates being couple to an output of a corresponding one of said first and second capacitors.

8. The apparatus of claim 7 further comprising a controller, each of said Exclusive-OR gates coupled to said controller for providing an output signal, said controller comparing said output signals from each of said pair of Exclusive-OR gates to determine a value indicative of the applied load which is a function of the differential capacitance of said first and second capacitors.

9. The apparatus of claim 1 wherein said first and second capacitors are electrically connected in series across said source of alternating electrical energy, an electrical node located at a juncture between said first and second capacitors being electrically connected to said output circuit, said output circuit determining a value indicative of the applied load as a function of the voltage at the electrical node, the voltage at the electrical node varying as a function of the differential capacitance of said first and second capacitors in response to the applied load.

10. The apparatus of claim 9 wherein said source of electrical energy provides a high frequency signal to said first capacitor of said differential capacitor, the voltage at the electrical node being a function of the differential capacitance between the first and second capacitors according and a function of the high frequency signal being provided by said source of electrical energy.

11. The apparatus of claim 10 wherein said monitoring circuit further includes an amplifier circuit electrically connected to the electrical node between said first and second capacitors, said amplifier circuit providing an amplified output signal indicative of the differential voltage at the electrical node.

* * * * *